United States Patent
Zhang et al.

(10) Patent No.: US 8,893,012 B1
(45) Date of Patent: Nov. 18, 2014

(54) VISUAL INDICATOR BASED ON RELATIVE RATING OF CONTENT ITEM

(71) Applicants: Xincheng Zhang, Sunnyvale, CA (US); Jia Liu, Sunnyvale, CA (US); Dongmin Zhang, Sunnyvale, CA (US); Michael P. Bachman, Sunnyvale, CA (US)

(72) Inventors: Xincheng Zhang, Sunnyvale, CA (US); Jia Liu, Sunnyvale, CA (US); Dongmin Zhang, Sunnyvale, CA (US); Michael P. Bachman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/654,241

(22) Filed: Oct. 17, 2012

(51) Int. Cl.
*G06Q 30/02* (2012.01)

(52) U.S. Cl.
CPC ........ *G06Q 30/0277* (2013.01); *G06Q 30/0245* (2013.01); *G06Q 30/0243* (2013.01)
USPC ..................... 715/738; 705/14.41; 705/14.42; 705/14.44

(58) Field of Classification Search
USPC ........................................................ 715/738
See application file for complete search history.

(56) References Cited

U.S. PATENT DOCUMENTS

| | | | |
|---|---|---|---|
| 6,133,915 A * | 10/2000 | Arcuri et al. ................... | 715/779 |
| 7,130,808 B1 | 10/2006 | Ranka et al. | |
| 7,523,859 B2 | 4/2009 | Patel et al. | |
| 7,793,211 B2 * | 9/2010 | Brenner ......................... | 715/230 |
| 8,112,310 B1 * | 2/2012 | Yehoshua et al. ........... | 705/14.42 |
| 8,171,388 B2 * | 5/2012 | Zaltzman et al. ............. | 715/200 |
| 8,275,663 B2 * | 9/2012 | Rochford et al. ........... | 705/14.67 |
| 8,521,136 B2 | 8/2013 | Riddle et al. | |
| 2004/0059625 A1 | 3/2004 | Schrader | |
| 2006/0230141 A1 | 10/2006 | Willis | |
| 2006/0265368 A1 | 11/2006 | Nickerson et al. | |
| 2008/0033790 A1 | 2/2008 | Nickerson et al. | |
| 2008/0040175 A1 | 2/2008 | Dellovo | |
| 2008/0086361 A1 | 4/2008 | Eliezerov | |
| 2008/0130524 A1 | 6/2008 | Volach et al. | |
| 2008/0184138 A1 | 7/2008 | Krzanowski et al. | |
| 2008/0300972 A1 | 12/2008 | Pujara | |
| 2009/0018915 A1 * | 1/2009 | Fisse ............................... | 705/14 |

(Continued)

FOREIGN PATENT DOCUMENTS

| KR | 10-2011-0067584 | 12/2009 |
|---|---|---|
| WO | WO-2008/141344 | 11/2008 |

OTHER PUBLICATIONS

"Kampyle for Ads Ad Feedback Analytics" accessed at http://www.kampyle.com/adfeedback, Aug. 29, 2011.
"Kampyle Introduces Ad Feedback to Connect Brands and Publishers with Online Customers and Visitors," issued on Nov. 2, 2010.

(Continued)

*Primary Examiner* — Matt Kim
*Assistant Examiner* — Daniel Samwel
(74) *Attorney, Agent, or Firm* — Foley and Lardner LLP; John D. Lanza

(57) ABSTRACT

A popularity score or rating may be provided for a third-party content item. The popularity score may be compared with an average score of similar genre third-party content items to determine a relationship of the popularity score relative to the average score of similar genre third-party content items. A popularity or other visual indicator may be provided proximate to the third-party content item to provide a visual indication of the relationship. The popularity indicator may include a bar or a plurality of symbols in some implementations.

20 Claims, 9 Drawing Sheets

(56) References Cited

U.S. PATENT DOCUMENTS

| | | |
|---|---|---|
| 2009/0106096 A1* | 4/2009 | Horowitz .................. 705/14 |
| 2009/0150553 A1 | 6/2009 | Collart et al. |
| 2009/0215539 A1 | 8/2009 | Xidos et al. |
| 2009/0292608 A1* | 11/2009 | Polachek .............. 705/14.44 |
| 2010/0191574 A1 | 7/2010 | Ziemann |
| 2010/0228593 A1 | 9/2010 | Belwadi et al. |
| 2010/0242060 A1 | 9/2010 | Liu et al. |
| 2010/0274674 A1 | 10/2010 | Roberts et al. |
| 2011/0040616 A1* | 2/2011 | Kannan et al. ......... 705/14.45 |
| 2011/0106630 A1* | 5/2011 | Hegeman et al. ....... 705/14.71 |
| 2011/0236872 A1 | 9/2011 | Taylor |
| 2012/0197711 A1* | 8/2012 | Zhou et al. ............. 705/14.41 |
| 2013/0067357 A1* | 3/2013 | Rose ........................ 715/760 |

OTHER PUBLICATIONS

International Search Report for PCT/US2012/063845, mailing date Mar. 18, 2013, 10 pages.

Markup.io, "Markup. Share. Done.", Oct. 8, 2010, http://web.archive.org/web/20101008131021/http://markup.io/, 2 pages.

US Office Action on U.S. Appl. No. 13/293,836 Dated Dec. 20, 2013, 26 pages.

Zoints, "Zoints Anonymous Posting", Oct. 15, 2006, http://www.vbulletin.org/forum/showthread.php?t=129108, 7 pages.

International Preliminary Report on Patentability on PCT/US2012/063845 dated May 22, 2014.

US Office Action on U.S. Appl. No. 13/293,836 Dated Apr. 22, 2014.

\* cited by examiner

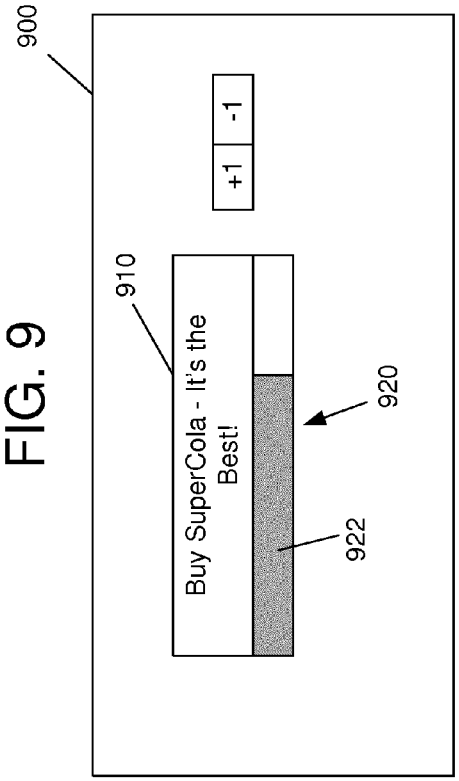
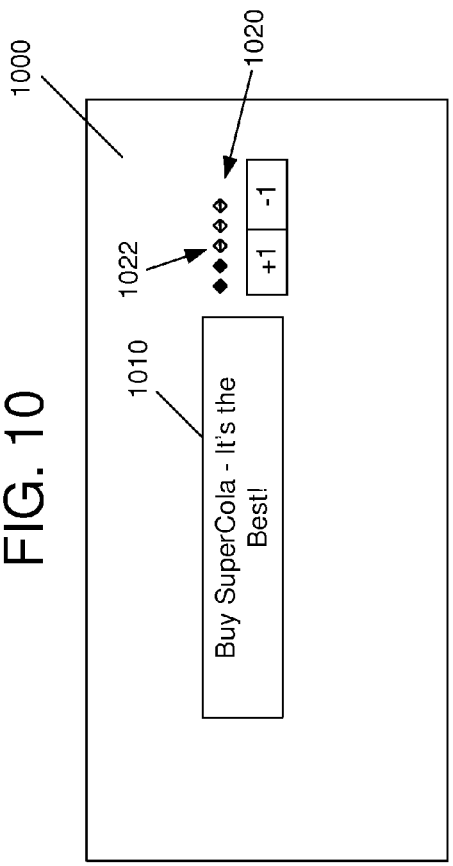

US 8,893,012 B1

VISUAL INDICATOR BASED ON RELATIVE RATING OF CONTENT ITEM

BACKGROUND

The Internet provides access to a wide variety of content. For instance, images, audio, video, and web pages for many different topics are accessible through the Internet. The accessible content provides an opportunity to present third-party content to users. The third-party content can provided with a resource accessed by a user, such as a web page, image, or video, and/or the third-party content can be displayed in response to a triggering event, such as presenting third-party content in a content slot within the resource and/or in a content slot of a pop-up window or other overlay.

SUMMARY

In some implementations, a system for displaying the visual indicator may include one or more data processors and one or more storage devices storing instructions to be executed by the one or more data processors. The instructions may cause the one or more data processors to perform an operation of receiving a popularity score for the third-party content item. A comparison may be made between the popularity score and an average score of similar genre third-party content items to determine a relationship between the popularity score and the average score. The system may provide data to effect display a popularity indicator proximate to the content item that provides a visual indication of the relationship.

In some implementations, a content display method may include receiving a popularity score for the third-party content item. A comparison may be made between the popularity score and an average score of similar genre third-party content items to determine a relationship between the popularity score and the average score. The method may include providing data to display a popularity indicator proximate to the content item that provides a visual indication of the relationship. The method may include providing a content item feedback region proximate to the third-party content item for receiving feedback about the third-party content item, such as a mark-up region for receiving mark-ups to the third-party content item and a text region for receiving text input about the third-party content item. The feedback region may be provided in response to determining that the received popularity score is less than the average score.

In some implementations, a computer readable storage device may store instructions to perform multiple operations. The operations may include providing a ratings input control proximate to a third-party content item for receiving a popularity score, and a popularity score may be received for the third-party content item. A determination of a click-through-rate may be made, and s comparison may be made between the sum of the popularity score with the click-through-rate and an average score of similar genre third-party content items to determine a relationship between the sum and the average score. The operations may include providing data to effect display of a popularity indicator proximate to the content item that provides a visual indication of the relationship. The operations may include determining whether the third-party content item is to be selected in future content item auctions based, in part, on the relationship.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 9 is an illustration that shows an example of a popularity indicator provided proximate to a third-party content item;

FIG. 10 is a drawing that shows an example of another popularity indicator provided proximate to a third-party content item.

Like reference numbers and designations in the various drawings indicate like elements.

DETAILED DESCRIPTION

One or more implementations may provide the capability for a user to provide feedback concerning third-party provided content items, such as advertisements, that the user is currently viewing on a resource, such as a web page. One or more implementations may use the feedback information to affect the ranking of the content to be used for future content auctions. One or more implementations may provide a visual indicator of a degree of popularity of the third-party content item.

Figure 1:
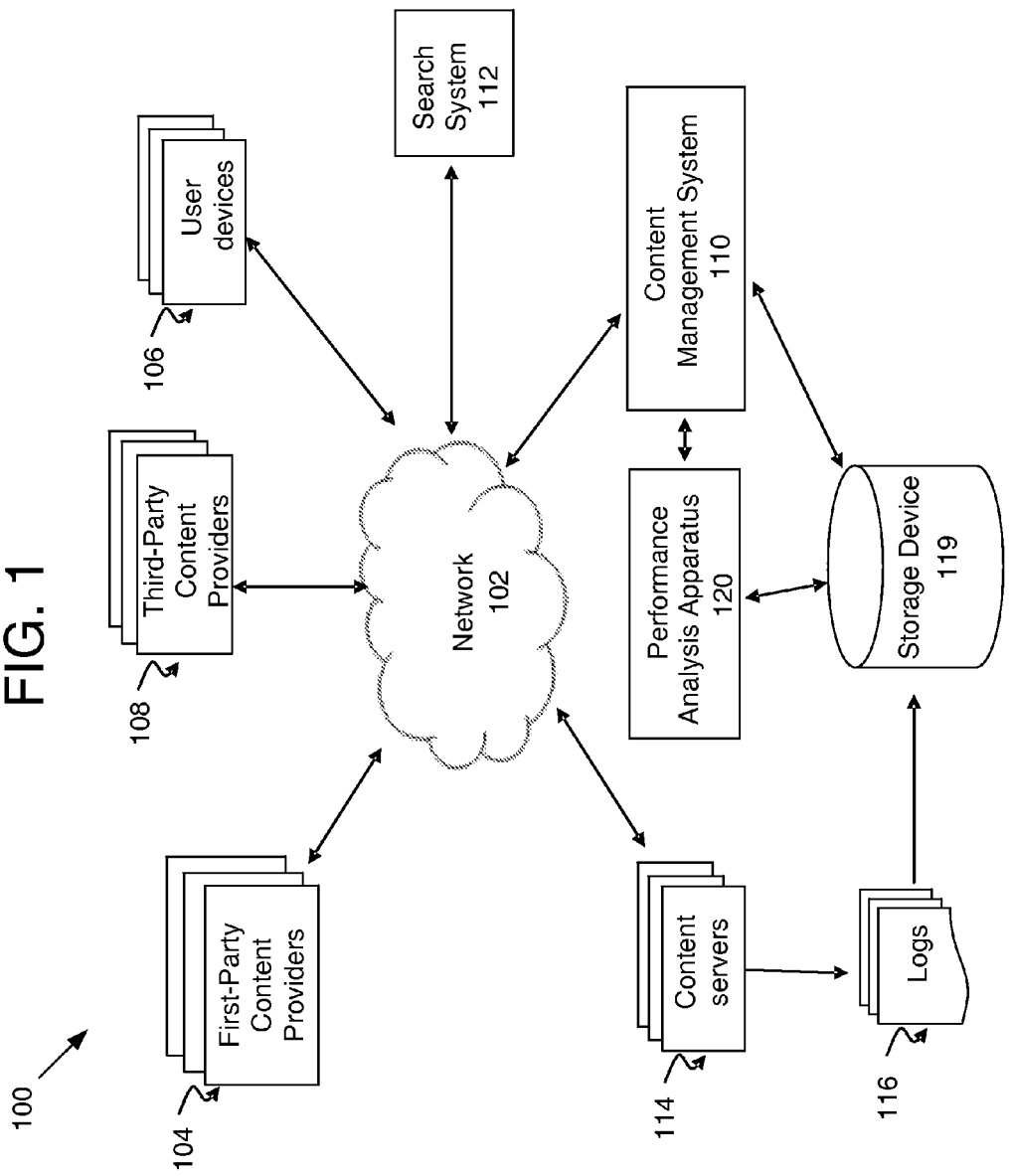
FIG. 1 is a block diagram of an example environment in which a content management system manages third-party content item services.

FIG. 1 is a block diagram of an example environment in which a content management system manages third-party content item services according to an illustrative implementation. The example environment 100 includes a network 102, such as a local area network (LAN), a wide area network (WAN), the Internet, or a combination thereof. The network 102 connects first-party content providers 104, user devices 106, third-party content providers 108, and a content management system 110. The example environment 100 may include many thousands of first-party content providers 104, user devices 106, and third-party content providers 108. User devices 106 may be associated with a device identifier. In some implementations, controls may be provided such that the device identifier may be anonymized, information may be modified and/or deleted, and/or other transparency or user controls are available.

A first-party content provider 104 may provide one or more resources associated with a domain name and hosted by one or more servers. A resource may include any data that can be provided over the network 102. A resource may be identified by a resource address that is associated with the resource, such as a uniform resource locator (URL). Resources can include web pages, word processing documents, portable document format (PDF) documents, images, video, programming elements, interactive content, and feed sources, to name only a few. An example resource is a collection of web pages formatted in hypertext markup language (HTML) that can contain text, images, multimedia content, and programming elements, such as scripts. The resources can include content, such as words, phrases, images and sounds, that may include embedded information (such as meta-information in hyperlinks) and/or embedded instructions. Embedded instructions can include code that is executed at a user's device, such as in a web browser. Code can be written in languages, such as, JavaScript® or ECMAScript®.

A user device 106 may be an electronic device that may be under control of a user and may be capable of requesting and receiving resources from first-party content providers 104 over the network 102. Example user devices 106 may include personal computers, mobile communication devices, and other devices that can send and receive data over the network 102. A user device 106 may include one or more applications, such as a web browser, to facilitate the sending and receiving of data over the network 102.

A user device 106 can request resources from a first-party content provider 104. In turn, resource data may be transmitted to the user device 106 to effect display of the requested resource by a display of the user device 106. The resource data may include data specifying a portion of the resource and/or a portion of a user display (e.g., a presentation location of a pop-up window or in a slot of a web page) in which third-party content items may be displayed. These specified portions of the resource and/or user display may be referred to as content item slots.

To facilitate searching of the vast number of resources accessible over the network 102, the environment 100 may include a search system 112 that identifies resources provided by first-party content providers by crawling and indexing one or more resource servers hosting the various resources provided by the first-party content providers 104. Resource data may be indexed based on the content of the resource. The indexed and, optionally, cached copies of the resource data may be stored in a search index (not shown).

User devices 106 can submit search queries to the search system 112 over the network 102. In response, the search system 112 may access the search index to identify resources that are relevant to the search query. In one illustrative implementation, a search query may include one or more keywords. The search system 112 may identify the resources that are responsive to the query, provide information about the resources in the form of search results, and transmit data to effect display of the search results on a display of the user devices 106 in response to the search query. An example search result may include data generated by the search system 112 that identifies a resource that is responsive to the search query, and may include a link to the resource. An example search result may include a title of the resource, a snippet of text or a portion of an image extracted from the resource, a rendering of the resource, and/or the URL of the resource. In some implementations, a resource displaying search results, such as a search result web page, may include one or more content item slots in which third-party content items, such as advertisements, may be displayed.

The resource data to effect display of a search result web page can be sent with a request from the search system 112 for a web browser of the user device 106 to create an HTTP (HyperText Transfer Protocol) cookie. A cookie may represent, for example, a particular user device 106 and/or a particular web browser of the user device 106. A user may control the use of cookies by, for example, disabling cookies in the browser's settings. The search system 112 may include a server that replies to the search query by sending the search results web page in an HTTP response. This HTTP response may include instructions (e.g., a set cookie instruction) that cause the browser to store a cookie for the resource hosted by the server or for the domain of the server. If the browser supports cookies and cookies are enabled, a subsequent request to the same server or a server within the domain of the server may include the cookie. The cookie can store a variety of data, including a device identifier. The device identifier can be anonymized and is not connected with the particular user. Because HTTP is a stateless protocol, the use of cookies allows an external service, such as the search system 112 or other system, to determine particular actions and statuses of a user device 106 associated with the device identifier over multiple sessions.

In some implementations, when a resource is requested by a user device 106, such as a first-party content provider's web page or a search result web page, the content management system 110 may receive a request for third-party content items to be provided with the resource. The request for third-party content items, such as advertisements, can include characteristics of the content item slots (e.g., dimensions, etc.) that are defined for the requested resource and can be provided to the content management system 110. For example, a reference (e.g., URL) to the resource for which the content item slot is defined, a size of the content item slot, and/or media types that are available for presentation in the content item slot can be provided to the content management system 110. Similarly, keywords (i.e., one or more words that are associated with content) associated with a requested resource ("resource keywords") and/or a search query keywords for which search results are requested can be provided to the content management system 110 to facilitate identification of third-party content items that are relevant to the requested resource or search query.

Based on data included in the request for third-party content items, the content management system 110 may select third-party content items that are eligible to be provided in response to the request (such as eligible advertisements, etc.). For example, eligible third-party content items can include advertisements having characteristics matching the characteristics of the content item slots and that may be determined to be relevant to specified resource keywords and/or search query keywords. In some implementations, advertisements having keywords that match the resource keywords and/or the search query keywords, or portions thereof, may be selected as eligible third-party content items by the content management system 110.

The content management system 110 may select an eligible third-party content item for each content item slot of a resource, such as a resource from a first-party content provider 104 and/or a resource having search results that is responsive to a search query. Data for the resource may be received by the user device 106 to effect display of the resource by the user device 106. User interaction data representing user interactions with the displayed third-party content items can be stored in a storage device 119. For example, when a third-party content item is displayed to the user via a content server 114, data may be stored in a log file 116. The log file 116, as more fully described below, can be aggregated with other data in the storage device 119. Accordingly, the storage device 119 may contain data indicative of the display of the third-party content item and/or user interactions with the third-party content item. For example, the presentation of an advertisement may be stored in response to a request for the advertisement that is presented. In some instances, the third-party content item request can include data identifying a particular cookie such that data identifying the cookie can be stored in association with data that identifies the advertisements that were presented in response to the request. In some implementations, the data can be stored directly to the storage device 119.

Similarly, when a user selects (i.e., clicks) a presented third-party content item, data representing the selection of the third-party content item can be stored in the log file 116, a cookie, or the storage device 119. In some implementations, the data is stored in response to a request for a resource to which the third-party content item is linked. For example, a user selection of a displayed advertisement can initiate a request for presentation of a resource, such as a web page, of the third party content provider 108. The request can include data identifying the particular cookie associated with a device identifier for the user device.

User interaction data can be associated with device identifiers that represent a corresponding user device 106 with which the user interactions were performed. For example, in some implementations, user interaction data can be associated with one or more cookies. Each cookie may include data that indicates an initialization time at which the cookie was initially created on the user device 106.

The log files 116, or the storage device 119, may store references to third-party content items and data representing conditions under which each third-party content item was selected for display to a user. For example, the storage device 119 can store keywords, bids, and other criteria with which eligible third-party content items were selected for display. The storage device 119 can include data that specifies a number of impressions for each third-party content item (i.e., the number of times the third-party content item was transmitted to a user device 106 for display). Data for each impression can be stored so that each impression and/or a user selection of the third-party content item can be associated with (i.e., stored with references to and/or indexed according to) the third-party content items that was selected and/or the keyword that caused the advertisement to be selected for presentation.

The third-party content providers 108 can submit to the content management system 110 campaign parameters (e.g., keywords and corresponding bids) that are used to control distribution of third-party content items, such as advertisements. The third-party content providers 108 can access the content management system 110 to determine performance of the third-party content items that are distributed using the campaign parameters. For example, a third-party content provider 108 can access a campaign performance report that provides a number of impressions (i.e., presentations), selections (i.e., clicks), and conversions that have been determined for the third-party content item. The campaign performance report can provide a total cost, a cost-per-click, and other cost measures for the third-party content item over a specified period of time. For example, a third-party content provider may access a performance report that specifies that a third-party content item distributed using the phrase match keyword "hockey" has received 1,000 impressions (i.e., has been presented 1,000 times), has been selected (e.g., clicked) 20 times, and has been credited with 5 conversions. Thus, the phrase match keyword hockey can be attributed with 1,000 impressions, 20 clicks, and 5 conversions.

While the foregoing describes some implementations for providing third-party content items for display on user devices 106, it may be useful to receive feedback from users regarding the third-party content items. For example, such feedback may be used to promote or demote third-party content items during a selection process or auction. In some implementations, the feedback may be used to effect display of a visual indicator proximate to the third-party content item that is indicative of other users' opinions of the third-party content item, such as an overall rating or a relative rating. In still other implementations feedback from users may be used for reporting inappropriate third-party content items, irrelevant third-party content items and/or offensive third-party content items such that those third-party content items may be removed from future selection and/or otherwise.

Figure 2:
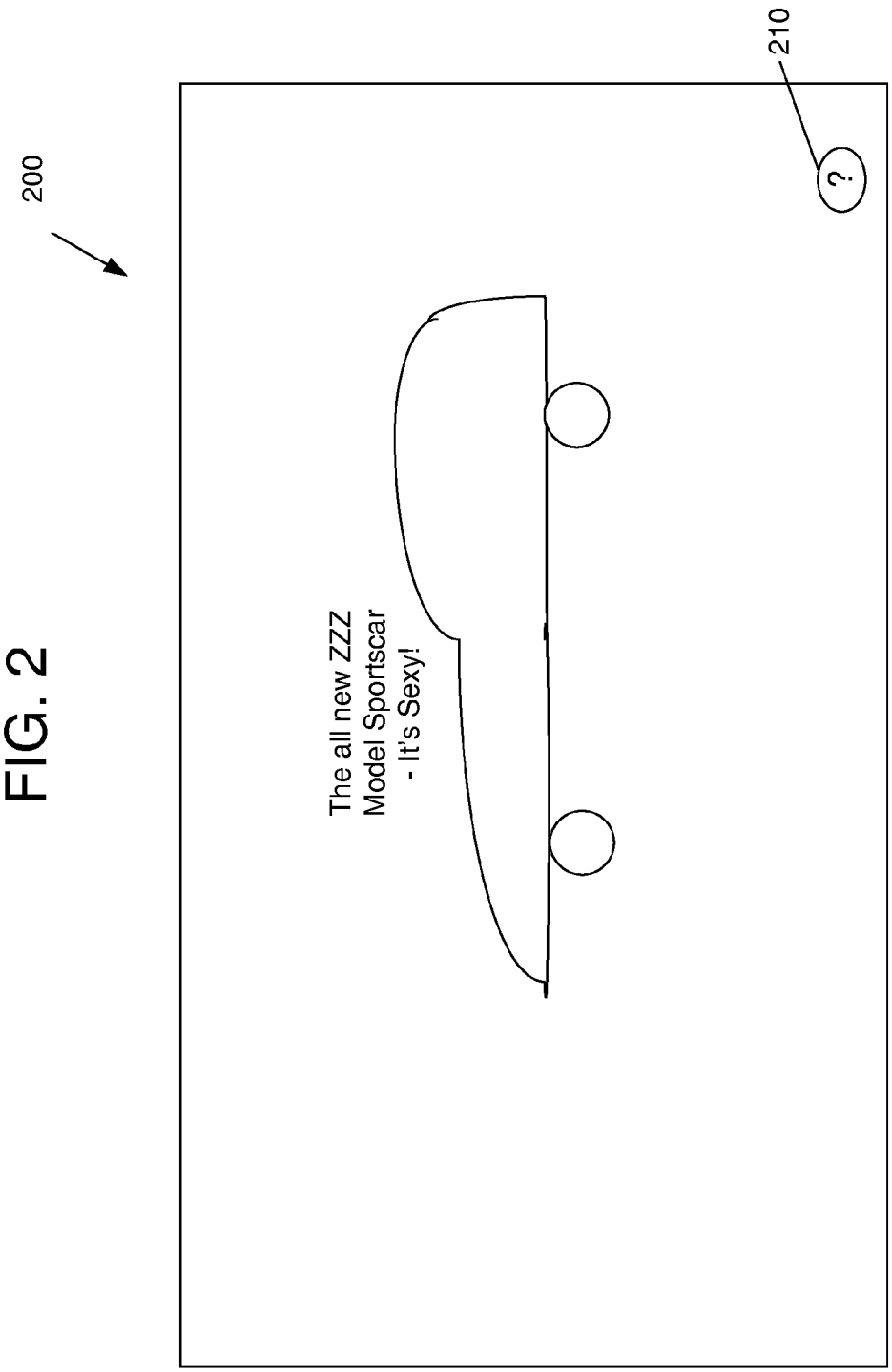
FIG. 2 is an illustration that shows an example of third-party content item and a feedback feature.

FIG. 2 is an illustration that shows an example of a vehicle third-party content item 200 according to an illustrative implementation. The third-party content item 200 may be provided with a resource, such as a web page, displayed to a user, for example, a web page of an automobile magazine. The third-party content item 200 is displayed to the user based on the third-party content item 200 winning an auction of third-party content items. Such an auction may occur in response to the user visiting a particular resource that allows third-party content items to be displayed along with the first-party content provider's content, for example, or by the user requesting a search for sports cars in which the third-party content item is displayed at a predetermined location of a search results screen (e.g., above the search results or to the right of the search results). The third-party content item 200 includes a feedback feature 210 which may be provided on the periphery of the third-party content item 200 that a user can click on to provide feedback regarding the third-party content item 200. In FIG. 2, the feedback feature 210 is shown as a small question mark ("?") on the bottom right portion of the automobile third-party content item 200, though other feedback features 210 and/or locations of the feedback feature 210 may be implemented. For example, the feedback feature 210 may be provided proximate to the third-party content item, but not actually on it.

Figure 3:
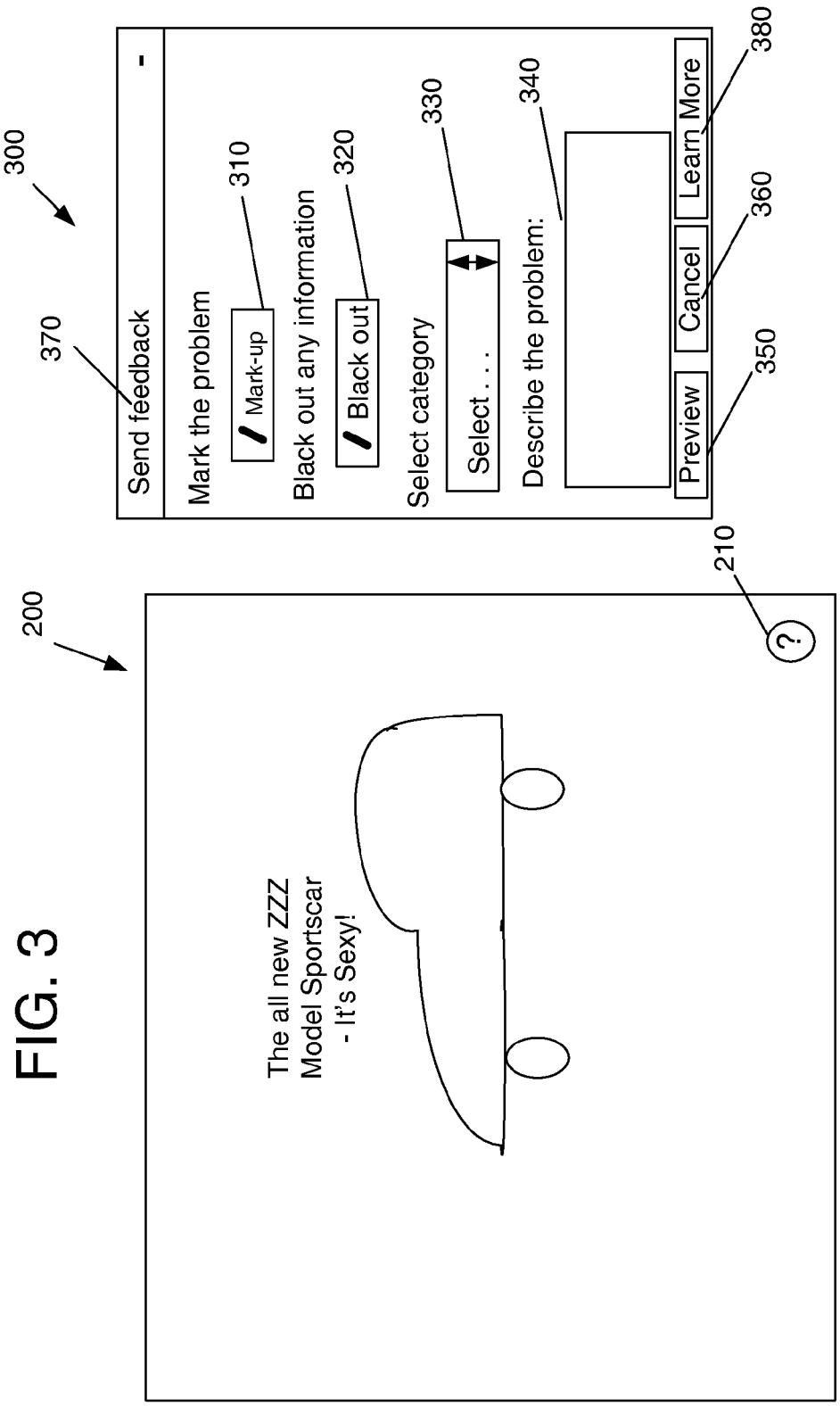
FIG. 3 is an illustration that shows an example of a feedback pop-up window provided proximate to the third-party content item.

In some implementations, when a user clicks on the feedback feature 210, a pop-up window 300 may appear proximate to the third-party content item 200, as shown in FIG. 3. In the pop-up window 300, the user may have the ability to highlight, identify or specify the issue that the user has with the third-party content item in a mark-up region by clicking on a mark-up button 310 (which may include a pencil icon to indicate to the user that he/she can mark-up portions of the third-party content item). The user may have the ability to black out or remove any information when sending the feedback by clicking on a black out button 320 (which may include a pencil icon to indicate to the user that he/she can blacken portions of the ad or screen shot before they are sent back to the server). The user may have the ability to select a category of feedback in a feedback type region 330. The user may have the ability to describe the problem by inputting text into a feedback text region 340 and preview the feedback by clicking on a Preview button 350. The user can cancel the sending of feedback by clicking on a Cancel button 360, and the user can send the feedback by clicking on a Send Feedback button 370 at the top left of the pop-up window 300. The user can learn more about the third-party content item feedback feature by clicking on the Learn More button 380 at the bottom right of the pop-up window 300.

Figure 4:
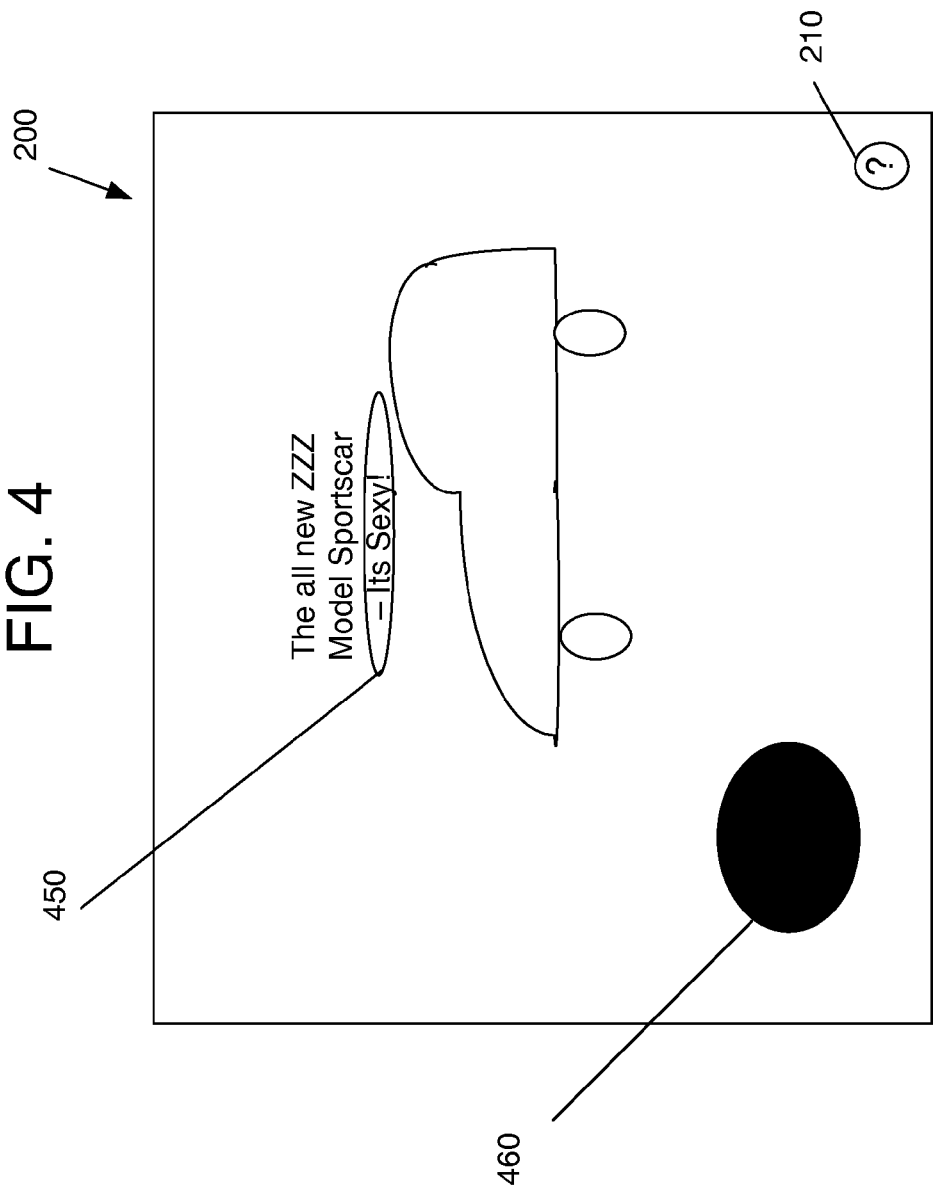
FIG. 4 is an illustration that shows an example of a marked-up third-party content item.

FIG. 4 is an illustration that shows an example of the mark-up feature for providing feedback. A user can move his/her mouse point over the third-party content item to allow the user to mark-up portions of the third-party content item. A drawing feature may be utilized to provide the user with the ability to circle or otherwise mark-up up portions of the third-party content item. That is, when the user clicks on the mark-up button 210 as shown in FIG. 3, a drawing feature may be executed to allow the user to mark-up the third-party content item (e.g., based on mouse movement over the third-party content item to allow the user to circle one or more areas of the third-party content item).

In particular, FIG. 4 shows a mark-up 450 made by a user to encircle a particular portion of the third-party content item 200 after the user clicked on the mark-up button 210. Thus, the third-party content item, including the mark-up 450, may be transmitted with any feedback when a user selects a Send Feedback button. In some implementations, a screen shot is taken of the marked-up third-party content item when the user has concluded marking it up, and that screen shot is transmitted with any other feedback. In the example shown in FIG. 4, text of the third-party content item has been marked by mark-up 450 to be provided with any other feedback from the user.

Referring back to FIG. 3, the black out button 320 may be used to allow a user to remove or otherwise hide information during the mark-up of the third-party content item. For example, identifying information may be removed from the feedback by the user by selecting the black out button 320 and blacking out any information the user chooses. In FIG. 4, a blacked out portion 460 of the third-party content item 200 is shown based on the user marking that portion to be blacked out.

In some implementations, a feedback type region 330 of the pop-up window 300 allows the user to select from a list of predetermined categories of feedback type. By way of example, the list may include: offensive content, inappropriate third-party content item for the resource that it is displayed with, third-party content item displayed incorrectly, and/or other feedback.

The feedback text region 340 may enable input of textual feedback regarding the third-party content item. For instance, feedback text region may permit the user to describe in greater detail the user's concerns with the third-party content item. By way of example, the feedback text region 340 may permit only a predetermined number of characters, e.g., 200 characters, of text to be included in the user feedback regarding the third-party content item.

Figure 5:
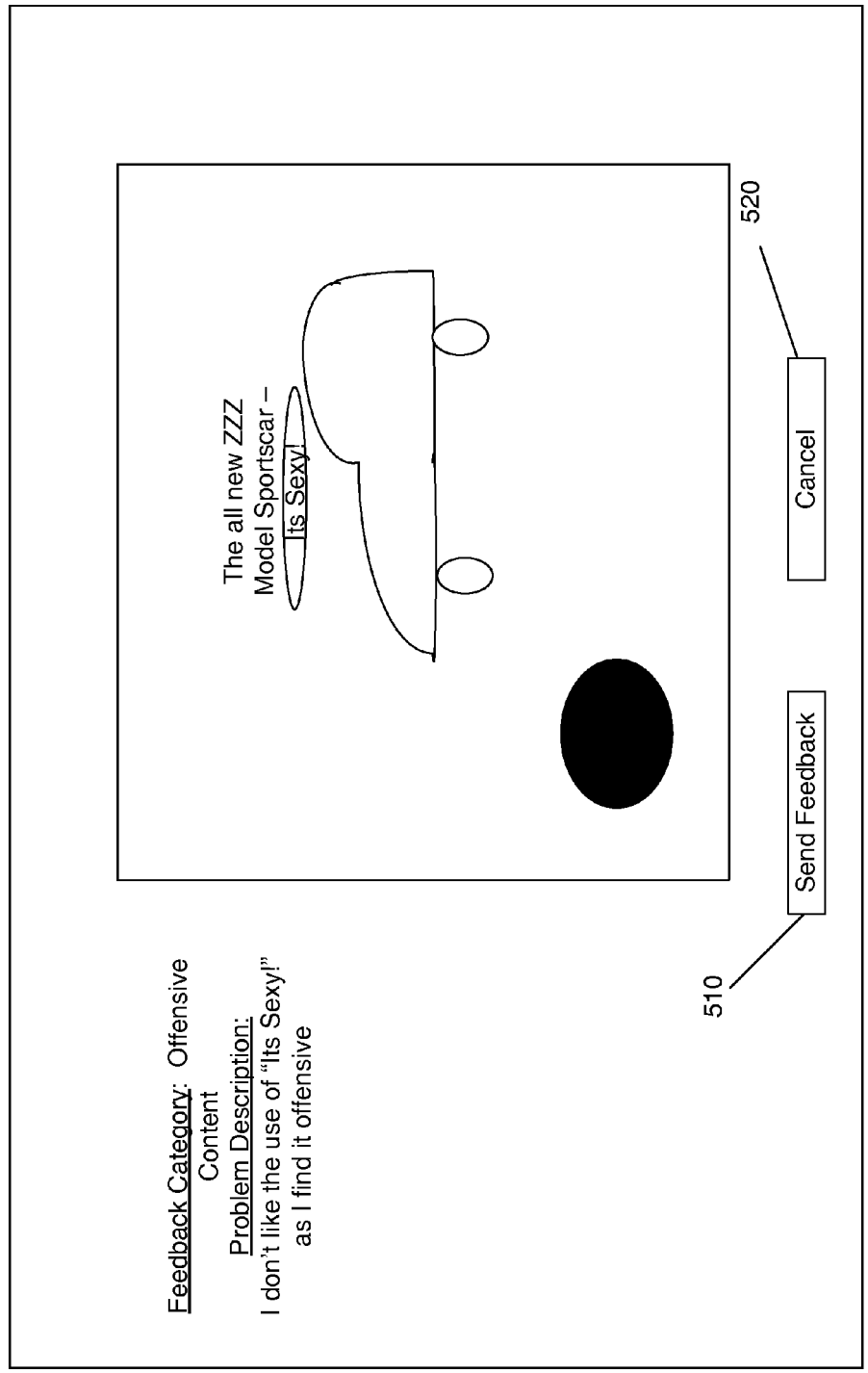
FIG. 5 is an illustration that shows an example of a feedback preview pop-up window.

The Preview button 350 may allow the user to preview the feedback prior to transmittal of the feedback. When the Preview button 350 is clicked, a Preview pop-up window, such as window 500 shown in FIG. 5. The Preview pop-up window 500 may cause a display of the feedback that will be transmitted regarding the third-party content item to be shown to the user such that the user may review the proposed feedback and make any changes prior to transmittal. The Preview pop-up window 500 may include a Send Feedback button 510, as shown in FIG. 5, that the user can select in order to continue with transmission of the feedback data regarding the third-party content item. The Preview pop-up window 500 may include a Cancel button 520 to return to feedback pop-up window 300 and/or to discard the third-party content item feedback entirely. A Cancel button 360 and a Send Feedback button 370 may be provided on the feedback pop-up window 300, as shown in FIG. 3.

The feedback data may be transmitted to a relevant third-party content provider and/or to the content management system. The feedback data can be sent to the third-party content provider to allow the third-party content provider to modify or otherwise alter the third-party content item in response to the feedback. The feedback data can be used to change a third-party content item's ranking. For example, a lower rated third-party content item may be less likely to be selected during third-party content item auctions. For example, third-party content item data may be entered by a third-party content provider for third-party content item auctions (e.g., keywords for which the third-party content item should be displayed, or the like). A third-party content provider may include a bid for the third-party content item (e.g., an amount that the third-party content provider agrees to pay each time the third-party content item is clicked by a user when the third-party content item is displayed on a resource). The foregoing may be used in a third-party content item auction to provide a ranking for the third-party content item to be compared with other third-party content items competing in the same third-party content item auction. For example, a third-party content item having a bid of $0.90 may be selected over a third-party content item having a bid of $0.70. In the instances where a third-party content item's ranking is lowered in response to user feedback data, a feedback factor may be manually or automatically modified based on the user feedback data. For example, negative user feedback data may decrement the feedback factor (e.g., 10 negative user feedback responses may decrement the feedback factor by 0.01 on a scale from 1.0 to 0.0). By lowering the ranking by a feedback factor, a third-party content provider may choose to modify or otherwise alter the third-party content item in response to the feedback and the lower ranking.

Figure 6:
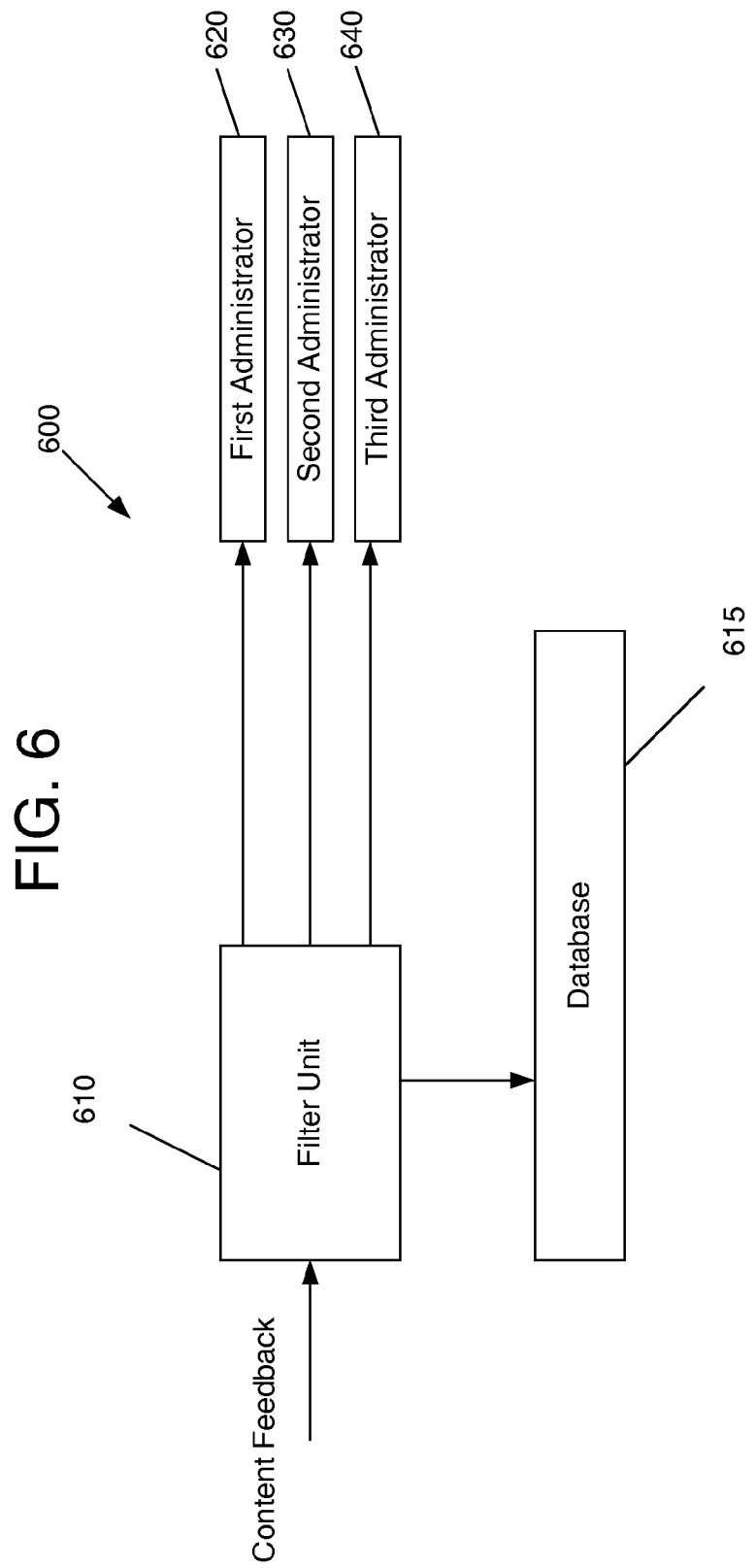
FIG. 6 is a block diagram showing example elements for receiving and directing third-party content item feedback.

In some implementations, the third-party content item feedback is filtered based on the category of third-party content item feedback entered by the user. The feedback may then be selectively sent to a corresponding person and/or department assigned to address that type of third-party content item feedback. FIG. 6 shows a third-party content item feedback system 600 that includes a filter module 610 that filters third-party content item feedback based on the type of third-party content item feedback such that the third-party content item feedback may be stored in a database 615 and/or provided to one or more administrators 620, 630, 640, based on the third-party content item feedback category as determined by a user's selection in the feedback type region 330 of the third-party content item feedback popup window (see FIG. 3). By providing feedback to the correct persons or departments, appropriate decisions can be made with respect to removing offensive or inappropriate third-party content items.

In some implementations, an indication of the popularity or usefulness of a third-party content item may be provided via a visual indicator or popularity indicator. Examples of such visual indicators may include a horizontal bar, a vertical bar, a symbol rating (e.g., 4 of 5 stars, "diamond-shaped" symbols, heart-shaped symbols, bubble sizes, etc.), and/or any other visual indicia of a rating to indicate a degree of popularity or usefulness of the third-party content item (such as compared to similar third-party content items, an overall popularity, or the like). For example, the longer the bar or more symbols shown and/or highlighted, the more popular the third-party content item may be. A very popular third-party content item, as evidenced by the visual indicator, may entice users to click on popular third-party content item to determine why the third-party content item is popular. Thus a third-party content provider may benefit from popular or useful third-party content items, such as by increased clicks on the third-party content item and/or otherwise. In some implementations, the data to effect display of the visual indicator for the third-party content item can be associated with the data to effect display of the third-party content item.

Figure 7:
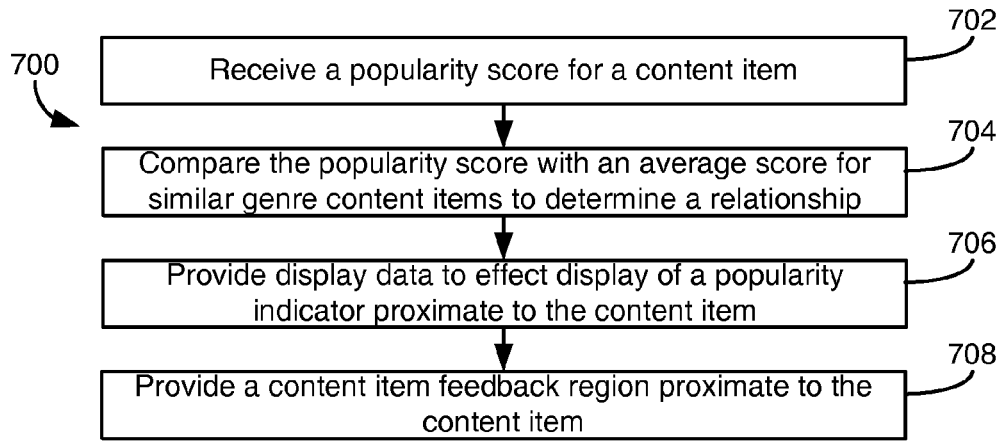
FIG. 7 is a flow diagram of an example method for providing a popularity indicator proximate to a third-party content item based on a relationship relative to an average score of similar genre third-party content items.

FIG. 7 is a flow diagram of an example method 700 for providing a visual indicator with a third-party content item. A popularity score may be received for a content item (step 702). For example, a ratings input control may be provided proximate to the third-party content item for allowing input of ratings of the third-party content item. In some instances, the ratings input control may include an increment button and a decrement button such that a user may provide a simple up or down indication for the third-party content item. In other implementations, the ratings input control may include several buttons, such as buttons corresponding to numerals 1 through 5, 0 through 5, 1 through 10, 0 through 10, etc. In still other versions, the ratings input control may include a slide bar such that a user may select and move the slide bar to provide a popularity score on a sliding scale. In some instances decimal values may be implemented with the ratings input control (e.g., such that ratings in increments of 0.5, 0.2, 0.1, 0.05, 0.01, etc. may be provided). Of course still other ratings input controls may be implemented as well.

A comparison may be made between the popularity score for the third-party content item and an average score for similar genre third-party content items to determine a relationship between the popularity score and the average score (step 704). In some implementations, the comparison may be made between the received popularity score such that the relationship is indicative of the user's specific rating relative to the average score. For example, if a user rates a third-party content item with a 7 on a scale of 0 to 10, where the average score for similar genre third-party content items is a 3, the relationship may indicate that the third-party content item is above average compared to similar genre third-party content items. In some other implementations, the comparison may be made between an average popularity score for the third-party content item after the received popularity score has been included into the average popularity score. For example, if a user rates a third-party content item with a 7 on a scale of 0 to 10 and the third-party content item's average rating is a 6.7 after including the received popularity score compared to an average score of 6.9 for similar genre third-party content items, then the relationship may be that the third-party content item is still slightly below average despite the slightly above average score form the user.

The relationship may be a qualitative relationship (e.g. very above average, above average, average, below average, very below average, etc.), a quantitative relationship (e.g., a percentage above an average, a value above an average, etc.), and/or any other relationship. Using the prior example, the third-party content item may be associated with a quantitative relative score of −0.2 indicating that the third-party content item is 0.2 points below the average score of similar genre third-party content items. In some implementations, a range of relative scores may be used to indicate the relationship. For example, a range of +0.5 to −0.5 (thus a 1.0 range) about the average may indicate an "at the average" relationship. A range of +0.51 to +1.5 may indicate an "above average" relationship. A range of >+1.51 may indicate a "very above average" relationship. Similarly, a range of −0.51 to −1.5 may indicate a "below average" relationship and a range of >−1.51 may indicate a "very below average" relationship.

In some implementations, the relationship may be used to determine how the visual indicator is displayed (e.g., the length of a bar indicator, a number of symbols highlighted or displayed, etc.). For example, if a third-party content item for running shoes has a 3.5 popularity score or rating and the average rating for other running shoe content items received is 3.0, then the relationship may be determined to be "above average." By way of example only, the horizontal bar 910 of FIG. 9 may be provide visual indicia (e.g., a length of the bar and/or otherwise) to reflect the third-party content item's "above average" rating. In some implementations, a received popularity score may be compared to the average rating of similar genre third-party content to determine the relationship of the received popularity score relative to the average score. The relationship may then be used to modify (e.g., increment up, down, and/or otherwise) the visual indicator. For example, a received popularity score that is indicated to have an above average relationship relative to similar genre third-party content items may increment the visual indicator while a below average relationship may decrement the visual indicator. The increments and/or decrements may be predetermined or may be weighted based on the number of prior popularity scores or ratings received.

The determination of which third-party content items are of the same or similar genre as the current third-party content item may be made by comparing keywords associated with third-party content items, whereby the keywords can be assigned to each third-party content items by third-party content providers and/or by the content management system. For example, a third-party content provider may include one or more keywords to be associated with the third-party content item when submitting the third-party content item for third-party content item auctions. In some instances, if at least one keyword of a third-party content item matches at least one keyword of another third-party content item, those two third-party content items may be categorized as belonging to the same or similar genre. In other implementations, content of the third-party content item itself (e.g., text within an advertisement) may be compared with content of other third-party content items to determine if those third-party content items are of the same or similar genre (e.g., advertisements that use the same or similar words regarding products or services for sale). In still other versions, third-party content items may be categorized as belonging to the same or similar genre only if two or more keywords of a third-party content item matches two or more keywords of another third-party content item.

In some implementations, the determination of whether two third-party content items are of the same or similar genre may be determined by classifying the keywords associated with the third-party content items into predefined categories (e.g., the keywords for "High Fidelity Zoom camera" may be classified as part of a "Computers and Electronics/Consumer Electronics/Camera and Photo Equipment" category), and comparing how many keywords are in the same category. For example, if at least 80% of the keywords associated with the two third-party content items are in the same category, then the two third-party content items may be categorized as of a same genre. If at least 60% of the keywords associated with the two third-party content items are in the same respective categories, then the two third-party content items may be categorized as of a similar genre.

Display data may be provided to effect display of a popularity indicator proximate to the third-party content item to provide a visual indication of the relationship (step 706). FIGS. 9-10 depict examples of popularity indicators that may be provided and will be described in greater detail below.

A content item feedback region may be provided proximate to the third-party content item (step 708). The content item feedback region may include a pop-up window, such as feedback pop-up window 300 described above, for the user to provide feedback about the third-party content item. The content item feedback region may include a mark-up region or portion to mark-up or otherwise provide visual indicia relative to the third-party content item and a text region for receiving textual input about the third-party content item. In some instances, the content item feedback region may be provided in response to a determination that the received popularity score is less than the average score for similar genre third-party content items. Thus, if a user has provided a low score for the third-party content item, the user may be automatically provided with the content item feedback region to provide additional information regarding the low score. In some implementations, the content item feedback region may be provided in response to a determination that the received popularity score is less than the average score for the particular third-party content item. Of course other implementations of the content item feedback region may be used.

A third-party content item may received a low score for several reasons, including but not limited to: the third-party content item not being relevant to the resource on which it is displayed (e.g., an advertisement for tennis shoes shown on a web page that sells fruit baskets may not be relevant, the third-party content item may be visually unappealing, the third-party content item may be considered to be from a non-reputable third-party content provider, etc.

Figure 8:
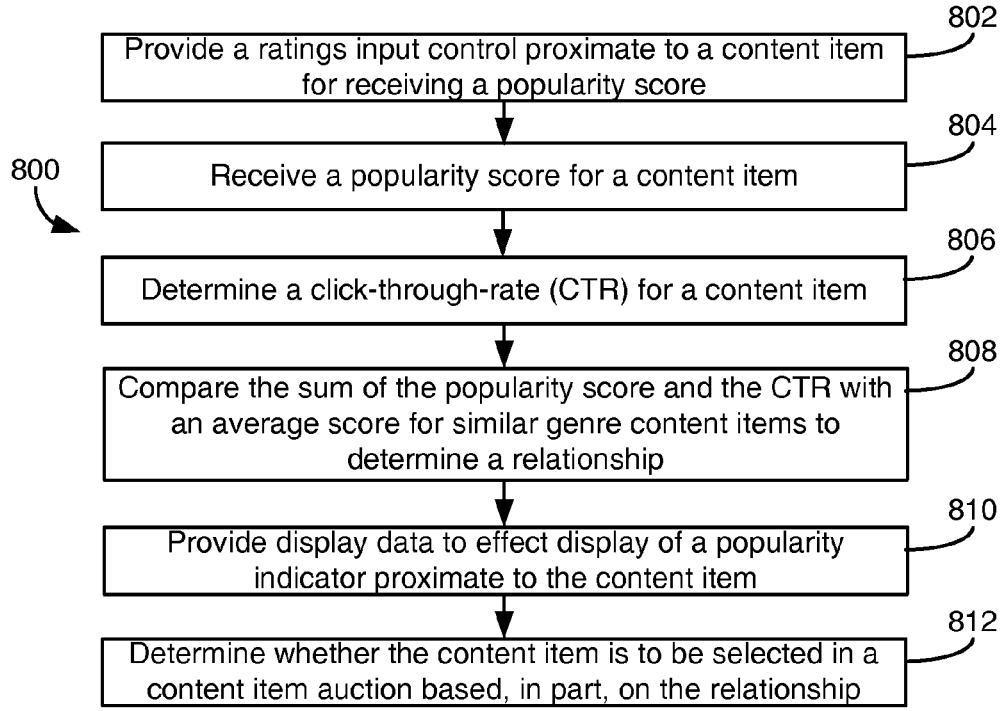
FIG. 8 is a flow diagram of another example method for providing a popularity indicator proximate to a third-party content item based on a relationship relative to an average score of similar genre third-party content items and based on a click-through-rate.

In some implementations, a third-party content item's score may be determined, at least in part, based on a number of selections or clicks on that third-party content item as compared to other third-party content items. FIG. 8 depicts a flow diagram for an example method 800 is shown utilizing a click-through-rate for a third-party content item in determining a popularity score for the third-party content item. A ratings input control may be provided proximate to the third-party content item for allowing input of ratings of the third-party content item (step 802). In some instances, the ratings input control may include an increment button and a decrement button such that a user may provide a simple up or down indication for the third-party content item. In other implementations, the ratings input control may include several buttons, such as buttons corresponding to numerals 1 through 5, 0 through 5, 1 through 10, 0 through 10, etc. In still other versions, the ratings input control may include a slide bar such that a user may select and move the slide bar to provide a popularity score on a sliding scale. In some instances decimal values may be implemented with the ratings input control (e.g., such that ratings in increments of 0.5, 0.2, 0.1, 0.05, 0.01, etc. may be provided). Of course still other ratings input controls may be implemented as well. A popularity score may be received based upon a user's interaction with the ratings input control (step 804).

A determination of a click-through-rate for the third-party content item may be made (step 806). For example, if a third-party content item is selected an average of 10 times for every 100 times the third-party content item is displayed (i.e., 10% of the time), then the click-through-rate may be determined to be 0.1 or 10%. Of course other determinations for the click-through-rate may be used as well.

A comparison may be made between a sum of the popularity score and the click-through-rate and an average score for similar genre third-party content items to determine a relationship (step 808). As discussed above, in some implementations, the comparison may be made between the received popularity score such that the relationship is indicative of the sum of the user's specific rating and the click-through-rate relative to the average score. In other implementations, the comparison may be made between the sum of the average popularity score for the third-party content item and the click-through-rate after the received popularity score has been included into the average popularity score.

By way of example only, if a third-party content items of a certain genre are typically clicked 10% of the time that the third-party content items are displayed, and if a particular third-party content item has been clicked 20% of the time that the third-party content item is displayed, then the popularity score for the third-party content item may be modified based on the click-through-rate. In the present example, the click-through-rate is added to the average popularity score of the third-party content item. In some implementations, the average popularity score for the third-party content item may be multiplied by a ratio of the click-through-rate relative to the average click-through-rate.

In some instances, new third-party content items that have yet to be displayed or for third-party content items that have only recently been shown to user devices, the click-through-rate of the third-party content item may be predicted, such as based on comparison to similar genre third-party content items and/or other third-party content items of the same third-party content provider. The click-through-rate prediction can be made by using a known click-through-rate of a first content item as the basis for the estimation where the first content item and the second content item are associated. The first and second content item may be associated based on keywords of the content items.

In some implementations, a weight may be assigned to the average popularity score and to the click-through-rate. For example, a resource server administrator may set a weight of one (1.0) to a third-party content item's click-through-rate and a weight of five (5.0) to the third-party content item's average popularity score. So, for example, if a third-party content item has a click-through-rate of 0.25 (i.e., the third-party content item is clicked 25% of the time that it is displayed or sent to devices) and a popularity score of 0.5 (on a 0 to 1 scale) as determined based on an average of the scores made on that third-party content item by users, then the third-party content item's weighted popularity score may be computed to be $(0.25*1.0)+(0.5*5.0)=2.75$. Based on the computed 2.75 popularity score of the third-party content item, in some implementations the third-party content item may be designated for promotion (e.g., to be shown to a greater number of user devices) or demotion (e.g., to be shown to a lesser number of user devices). For example, if a weighted popularity score of similar genre advertisements is 3.5, then this third-party content item may be considered for demotion due to its lower-than-average popularity score. In some implementations the weight for the click-through-rate may be higher than the weight for the average popularity score and vice-versa.

Using the comparison of the sum with the average score for similar genre content items, a relationship may be determined, such as described in greater detail above in reference to step 704 of FIG. 7.

Display data may be provided to effect display of a popularity indicator proximate to the third-party content item to provide a visual indication of the relationship (step 810). FIGS. 9-10 depict examples of popularity indicators that may be provided and will be described in greater detail below.

In some implementations, a determination may be made whether the third-party content item is to be selected in a content item auction based on the relationship (step 812). For example, the popularity or non-popularity of a third-party content item may be utilized to affect the ranking of the third-party content item for a third-party content item auction.

A third-party content item auction may include a variety of factors to determine a ranking of third-party content items during the selection of one or more third-party content item to be provided for display with a resource. For instance, a quality score for candidate third-party content items may be determined based on a similarity between the keywords associated with a candidate third-party content item and keywords associated with a resource of a first-party content provider (e.g., the third-party content item is similar to the content of the resource) and/or keywords extracted from a search query string. A monetary value associated with a candidate third-party content item may be based on a bid (such as a bid based on a cost-per-click value for the third-party content item) assigned by a third-party content provider for the candidate third-party content item. For example, if a third-party content provider assigns a bid value of 0.01, the third-party content provider may be willing to pay 1 cent each time the third-party content item is clicked. Using the quality score and the bid, a ranking may be determined for the third-party content item (e.g., by multiplying the bid by the quality score).

In some implementations, the ranking of a third-party content item in a third-party content item auction can be based on the third-party content item's popularity score, quality score, relative score, monetary value, and/or other data. For example, popular third-party content items may be associated with a popularity factor having a relatively high weight (e.g., a weight of 1.5) to increase the ranking computed for those third-party content items. For third-party content items having only an average popularity score, then those third-party content items may be associated with a popularity factor having an average weight (e.g., a weight of 1.0) so as not to change the ranking computed for those third-party content items. Lastly, for third-party content items having a low popularity, then those third-party content items may be associated with a popularity factor having a relatively low weight (e.g., a weight of 0.5) to lower the ranking computed for those third-party content items. Other determinations for whether a third-party content item, such as an advertisement, is to be selected for display in future content item auctions may be based on the popularity score, quality score, relative score, monetary value, and/or other data.

In some implementations, the popularity score of a third-party content item may be stored with reference to a geographic location from which the popularity score was received. By way of example, for a third-party content item that has received 55 ratings from user devices in Europe with a relationship indicative of an "above average" score and for that same third-party content item that has received 38 ratings from user devices in the United States with a relationship that is indicative of a "below average" score, that third-party content item may be shown to future user devices with an appropriate popularity rating based on the location of those future user devices. Information as to the location may be obtained from the user device's browser, such as from cookies or the like.

In some implementations, the score for a third-party content item by a user is received and averaged with previous ratings made for the same third-party content item by other users to whom the third-party content item has been displayed. The average score value for a third-party content item may then recomputed using the most recently received scores for the third-party content item (e.g., the scores received from users over the past 24 hours). In some implementations, the popularity scores for the third-party content items may be computed periodically, such as every 24 hours, every two days, every week, etc. The updated popularity scores may then be displayed with the third-party content item for future impressions of the third-party content item to users. In some implementations, the most-recently received popularity scores from users may be weighed more than older popularity scores. For example, ratings made for a third-party content item by users within the last 24 hours may be weighted twice as much as popularity scores made for the third-party content item more than 24 hours ago.

By having such a rating system, third-party content providers are incentivized to make their third-party content items more interesting and more entertaining to users, which may make the online experience better.

FIG. 9 depicts and illustration of one example popularity indicator 920 that may be provided proximate to a third-party content item 910 for an example resource 900. Popularity indicator 920 includes a horizontal bar 922, whereby the length of the bar 922 is that is representative of the relationship for the third-party content item 910, such as those determined by methods 700 and/or 800 of FIGS. 7-8. Proximate to the third-party content item 910 are provided a ratings input controls, such as increment or decrement buttons. Of course other ratings input controls, such as those described above, may be implemented as well. In the present example, in response to a user selecting an increment or decrement ratings button, the bar 922 may increase or decrease in length based on the relationship of the popularity score relative an average rating of similar genre third-party content items. The ratings input control may indicate the user interest in promoting or demoting the ad. In the example shown, the horizontal bar 920 is approximately ⅔rds filled, thereby indicating that the third-party content item 910 has a relationship of "above average" relative to the average score of similar genre third-party content items. Of course other linear (e.g., vertical bars, diagonal bars, etc), area-based (e.g., various sized circles, various sized squares, etc.), and/or other indicators may be used.

FIG. 10 depicts another example popularity indicator 1020 that may be provided proximate to a third-party content item 1010 for an example resource 1000. In the present example, popularity indicator 1020 includes a number of symbols 1022, such as diamonds, to provide a visual indicator of the relationship for the third-party content item 1010, such as those determined by methods 700 and/or 800 of FIGS. 7-8. The symbols 1022 may be filled, highlighted, differently colored, and/or otherwise to provide a visual indicator that is representative of the relationship. In the current example, five symbols 1022 are provided proximate to the third-party content item 1010, whereby five out of five symbols 1022 being highlighted or colored in a particular color (e.g., gold) is indicative of the third-party content item 1010 being very above average, four out of the five symbols 1022 being highlighted or colored in a particular color (e.g., gold) is indicative of the third-party content item 1010 being above average, etc. Of course any number of symbols 1022 and any configuration for the symbols 1022 may be used as well.

For third-party content items, such as content items 910, 1010, having a relationship determined to be below an average rating, the relevant portion of the popularity indicator, such as bar 922 and/or symbols 1022, may be displayed having a particular color that is indicative of the below average rating, such as red or black. For third-party content items having a relationship determined to be above an average rating, the relevant portion of the popularity indicator may be displayed having a particular color that is indicative of the above average rating, such as green or gold.

Figure 11:
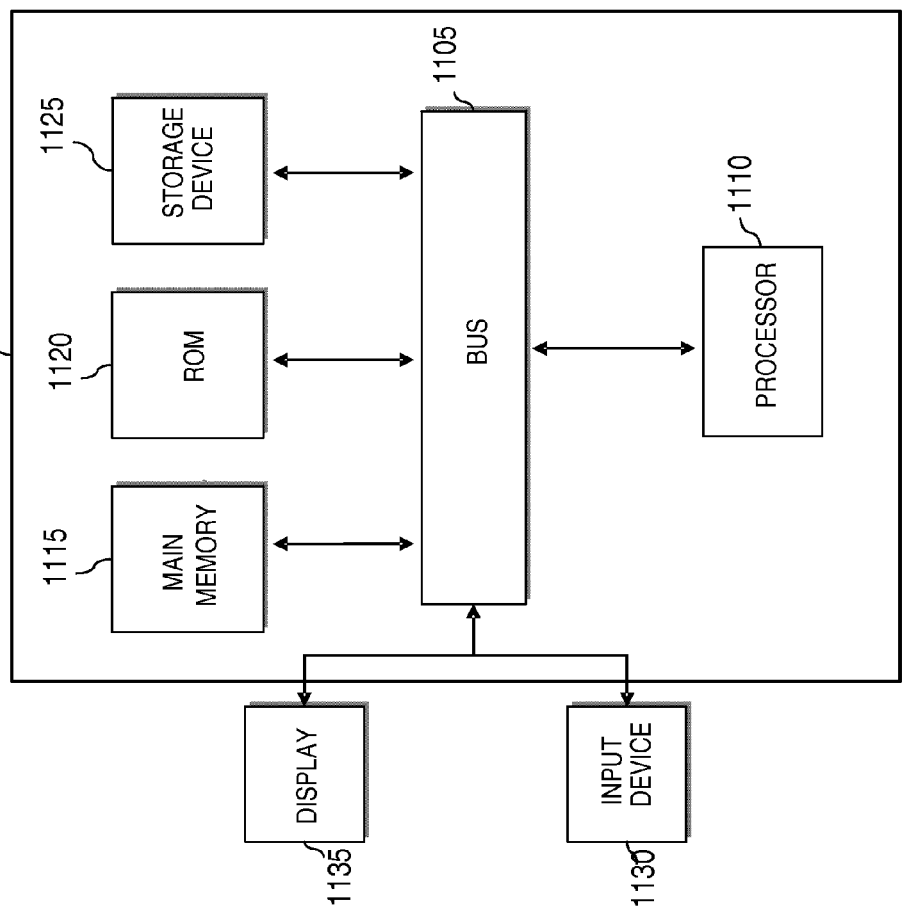
FIG. 11 is a block diagram illustrating an architecture for a computer system that may be employed to implement various elements of the systems and methods.

FIG. 11 shows the general architecture of an illustrative computer system 1100 that may be employed to implement any of the methods or systems discussed herein in accordance with some implementations. The computing system 1100 includes a bus 1105 or other communication mechanism for communicating information and a data processor 1110 coupled to the bus 1105 for processing information. The computing system 1100 includes main memory 1115, such as a random access memory (RAM) or other dynamic storage device, coupled to the bus 1105 for storing information, and instructions to be executed by the processor 1110. Main memory 1115 can be used for storing position information, temporary variables, or other intermediate information during execution of instructions by the processor 1110. The computing system 1100 may include a read only memory (ROM) 1110 or other static storage device coupled to the bus 1105 for storing static information and instructions for the processor 1110. A storage device 1125, such as a solid state device, magnetic disk or optical disk, is coupled to the bus 1105 for persistently storing information and instructions.

The computing system 1100 may be coupled via the bus 1105 to a display 1135, such as a liquid crystal display, or active matrix display, for displaying information to a user. An input device 1130, such as a keyboard including alphanumeric and other keys, may be coupled to the bus 1105 for communicating information, and command selections to the processor 1110. In another implementation, the input device 1130 has a touch screen display 1135. The input device 1130 can include a cursor control, such as a mouse, a trackball, or cursor direction keys, for communicating direction information and command selections to the processor 1110 and for controlling cursor movement on the display 1135.

According to various implementations, the processes that effectuate illustrative implementations that are described herein can be implemented by the computing system 1100 in response to the processor 1110 executing an arrangement of instructions contained in main memory 1115. Such instructions can be read into main memory 1115 from another computer-readable storage device, such as the storage device 1125. Execution of the arrangement of instructions contained in main memory 1115 causes the computing system 1100 to perform the illustrative processes described herein. One or more processors in a multi-processing arrangement may be employed to execute the instructions contained in main memory 1115. In alternative implementations, hard-wired circuitry may be used in place of or in combination with software instructions to implement illustrative implementations. Thus, implementations are not limited to any specific combination of hardware circuitry and software.

Although an example processing system has been described in FIG. 11, implementations of the subject matter and the functional operations described in this specification can be implemented in other types of digital electronic circuitry, or in computer software embodied in a tangible medium, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations. Certain features that are described in this specification in the context of separate implementations can be implemented in combination in a single implementation. Conversely, various features that are described in the context of a single implementation can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

For situations in which the systems discussed here collect information about users, or may make use of information about users, the users may be provided with an opportunity to control whether programs or features that may collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how information is collected about them and used by a content server.

What is claimed is:

1. A system for content display, comprising:
one or more data processors; and
one or more storage devices storing instructions that, when executed by the one or more data processors, cause the one or more data processors to perform operations comprising:
receiving a first popularity score for a third-party content item that has been provided to a first set of one or more devices, the first popularity score based on input from the first set of one or more devices;
determining an average popularity score of a plurality of similar third-party content items, the average score based on a plurality of second popularity scores for the plurality of similar third-party content items, the plurality of second popularity scores based on input from a second set of one or more devices and each associated with one of the similar third-party content items;

comparing the first popularity score with the average popularity score of the similar third-party content items to determine a relationship between the first popularity score and the average popularity score; and providing data to effect display of a popularity indicator proximate to the third-party content item that provides a visual indication of the relationship, wherein the popularity indicator provides an indication of whether a popularity of the third-party content item is above or below an average popularity of the similar third-party content items.

2. The system according to claim 1, wherein the popularity indicator comprises an indicator having a length that is representative of the relationship or wherein the popularity indicator comprises a number of symbols, wherein the number of symbols that are highlighted are representative of the relationship.

3. The system according to claim 1, wherein the instructions further cause the one or more data processors to perform operations comprising:

providing a ratings input control proximate to the third-party content item for allowing input of ratings of the third-party content item.

4. The system according to claim 1, wherein the instructions further cause the one or more data processors to perform operations comprising:

determining whether the content item is to be selected for display in future content item auctions based, in part, on the relationship.

5. The system according to claim 4, wherein the determining is further based on a quality score assigned to the third-party content item and a cost-per-click value assigned to the third-party content item.

6. The system according to claim 1, wherein the instructions further cause the one or more data processors to perform operations comprising:

providing a content item feedback region proximate to the third-party content item for receiving feedback on the third-party content item.

7. The system according to claim 6, wherein the feedback region comprises:

a mark-up region for receiving markups on the third-party content item; and a text region for receiving text input about the third-party content item.

8. The system according to claim 6, wherein the content item feedback region is provided in response to determining that the first popularity score is less than the average popularity score.

9. A content display method, comprising:

receiving, by one or more data processors, a first popularity score for a third-party content item that has been provided to a first set of one or more devices, the first popularity score based on input from the first set of one or more devices;

determining, by the one or more data processors, an average popularity score of a plurality of similar third-party content items, the average score based on a plurality of second popularity scores for the plurality of similar third-party content items, the plurality of second popularity scores based on input from a second set of one or more devices and each associated with one of the similar third-party content items;

comparing, by the one or more data processors, the first popularity score with the average popularity score of the similar third-party content items to determine a relationship between the first popularity score and the average popularity score;

providing, by the one or more data processors, data to effect display of a popularity indicator proximate to the third-party content item that provides a visual indication of the relationship, wherein the popularity indicator provides an indication of whether a popularity of the third-party content item is above or below an average popularity of the similar third-party content items; and providing, by the one or more data processors, a content item feedback region proximate to the third-party content item for receiving feedback about the third-party content item, wherein the content item feedback region comprises:

a mark-up region for receiving mark-ups on the third-party content item, and a text region for receiving text input about the third-party content item, wherein the content item feedback region is provided in response to determining that the received first popularity score is less than the average popularity score.

10. The content display method according to claim 9, wherein the popularity indicator comprises an indicator having a length that is representative of the relationship or wherein the popularity indicator comprises a number of symbols, wherein the number of symbols that are highlighted are representative of the relationship.

11. The content display method according to claim 9, further comprising:

providing, by the one or more processors, data to effect display of a ratings input control proximate to the third-party content item for allowing input of ratings of the third-party content item.

12. The content display method according to claim 9, further comprising:

determining, by the one or more data processors, whether the content item is to be selected for display in future content item auctions based, in part, on the relationship.

13. The content display method according to claim 12, wherein the determining is further based on a quality score assigned to the third-party content item and a cost-per-click value assigned to the third-party content item.

14. The content display method according to claim 9, wherein the relationship is a quantitative relationship.

15. A non-transitory computer readable storage device storing instructions that, when executed by one or more data processors, cause the one or more data processors to perform operations comprising:

providing a ratings input control proximate to a third-party content item for receiving a first popularity score for the third-party content item;

receiving the first popularity score for the third-party content item that has been provided to a first set of one or more devices, the first popularity score based on input from the first set of one or more devices;

determining a first click-through-rate for the third-party content item;

determining a plurality of second popularity scores based on input from a second set of one or more devices, the plurality of second popularity scores each associated with one of a plurality of similar third-party content items;

determining a plurality of second click-through rates for the similar third-party content items, each of the plurality of second click-through rates associated with one of the similar third-party content items;

determining a plurality of individual scores for the similar third-party content items, each individual score associated with one of the similar third-party content items and determined based on a sum of the second popularity score and the second click-through rate for the similar third-party content item;

determining an average score of the similar third-party content items based on the plurality of individual scores;

comparing a sum of the first popularity score and the first click-through-rate with the average score of the similar third-party content items to determine a relationship between the sum and the average score;

providing data to effect display of a popularity indicator proximate to the third-party content item that provides a visual indication of the relationship, wherein the popularity indicator provides an indication of whether a popularity of the third-party content item is above or below an average popularity of the similar third-party content items; and determining whether the third-party content item is to be selected in future content item auctions based, in part, on the relationship.

16. The non-transitory computer readable storage device according to claim 15, wherein the popularity indicator comprises an indicator having a length that is representative of the relationship or a number of symbols, wherein the number of symbols that are highlighted are representative of the relationship.

17. The non-transitory computer readable storage device according to claim 15, wherein the first popularity score is associated with a first predetermined weight and the first click-through-rate is associated with a second predetermined weight, wherein the sum of the first popularity score and the first click-through-rate is based on the sum of the first popularity score multiplied by the first predetermined weight and the first click-through-rate multiplied by the second predetermined weight.

18. The non-transitory computer readable storage device according to claim 17, wherein the first weight is greater than the second weight.

19. The non-transitory computer readable storage device according to claim 18, wherein the determining of whether the third-party content item is to be selected for display in future content item auctions is further based on a quality score assigned to the third-party content item and a cost-per-click value assigned to the third-party content item.

20. The non-transitory computer readable storage device according to claim 19, wherein the instructions further cause the one or more data processors to perform operation of:

providing a content item feedback region proximate to the third-party content item for receiving feedback on the third-party content item, wherein a content item feedback region is provided in response to determining that the sum is less than the average score.

\* \* \* \* \*